(No Model.) 2 Sheets—Sheet 1.

R. LUNDELL.
ELECTRIC MOTOR OR DYNAMO ELECTRIC MACHINE.

No. 481,701. Patented Aug. 30, 1892.

Witnesses
C. E. Ashley
G. M. Chamberlain

Inventor
Robert Lundell
By his Attorney
Charles J. Kintner

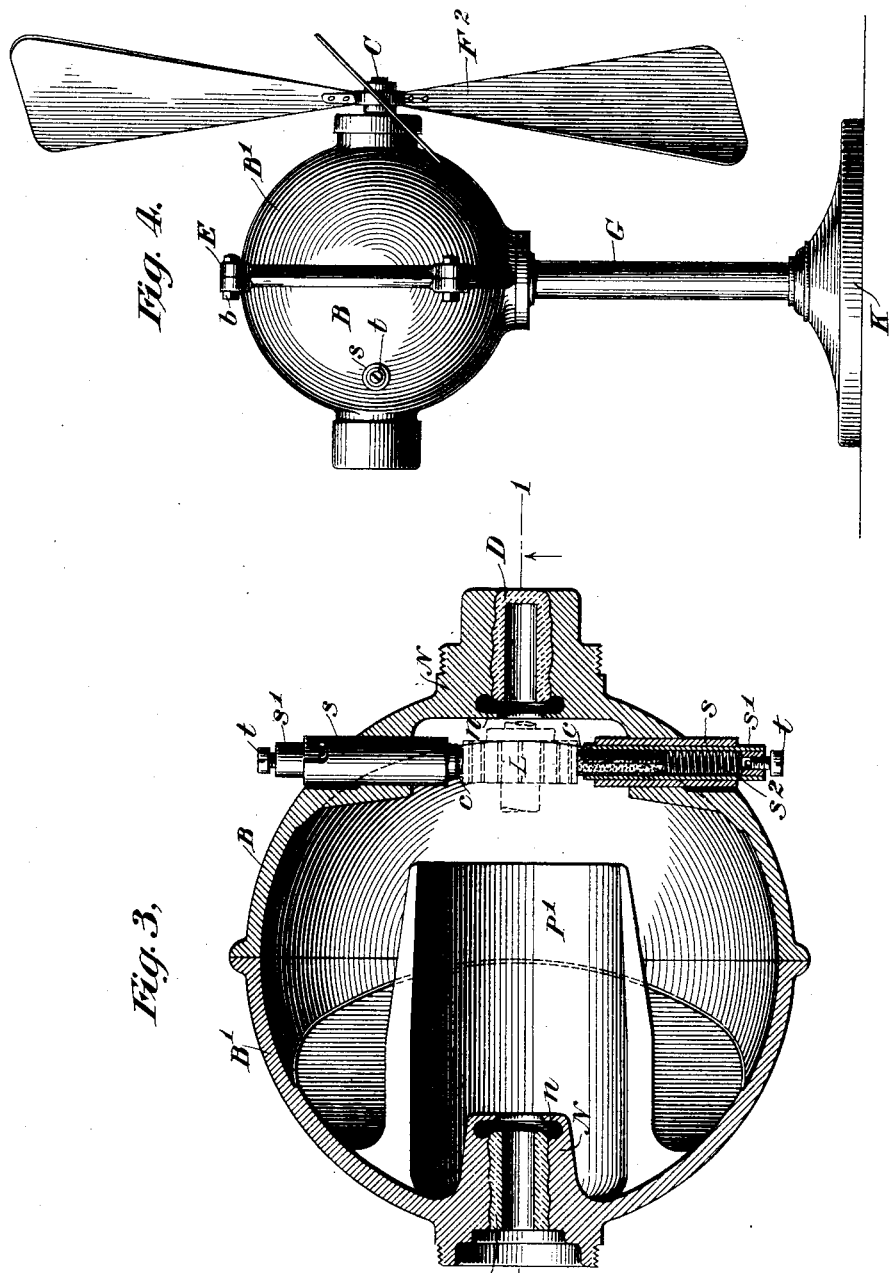

UNITED STATES PATENT OFFICE.

ROBERT LUNDELL, OF BROOKLYN, ASSIGNOR OF TWO-THIRDS TO EDWARD H. JOHNSON, OF NEW YORK, N. Y.

ELECTRIC MOTOR OR DYNAMO-ELECTRIC MACHINE.

SPECIFICATION forming part of Letters Patent No. 481,701, dated August 30, 1892.

Application filed March 14, 1892. Serial No. 424,813. (No model.) Patented in England May 17, 1892, No. 9,365.

*To all whom it may concern:*

Be it known that I, ROBERT LUNDELL, a citizen of the United States, residing at Brooklyn, in the county of Kings and State of New York, have made a new and useful Invention in Electric Motors or Dynamo-Electric Machines, (for which Letters Patent have been granted in Great Britain, bearing date May 17, 1892, No. 9,365, in the names of myself and Edward H. Johnson, of New York, N. Y, and for which, also, applications for patents have been filed in the names of the said Edward H. Johnson and myself in France, Italy, and Spain on or about the 17th day of May, 1892,) of which the following is a specification.

My invention has for its objects, first, the construction of an electric motor in such manner as to conceal all of the operative parts thereof; second, the arrangement of all of the parts thereof in the most compact and symmetrical manner; third, to devise an electric motor in which there shall result a minimum leakage of the magnetic lines of force; fourth, to construct an electric motor having the specific features hereinafter described, and fully illustrated in the accompanying drawings. I accomplish these several objects with the apparatus hereinafter described, and particularly pointed out in the claims at the end of this specification.

For a full, clear, and exact understanding of my invention, such as will enable others skilled in the art to which it most nearly relates to construct and use the same, reference is had to the following specification, taken in connection with the accompanying drawings, in all of which like letters represent like parts wherever used.

Figure 2:
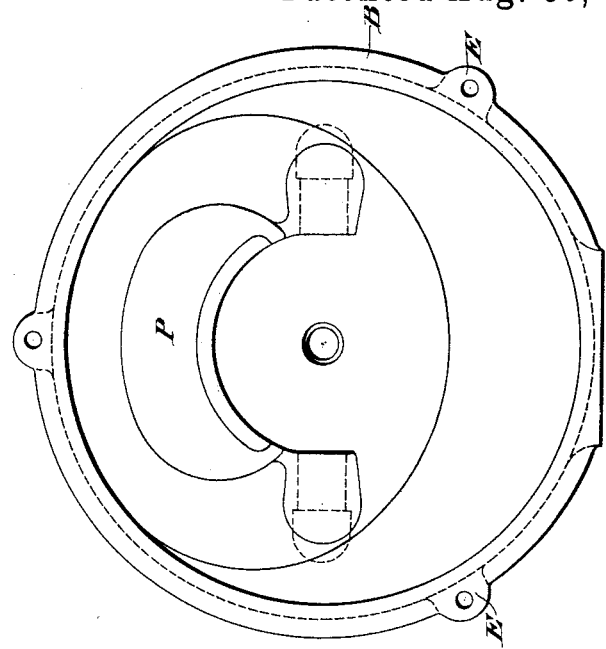
Figure 1:
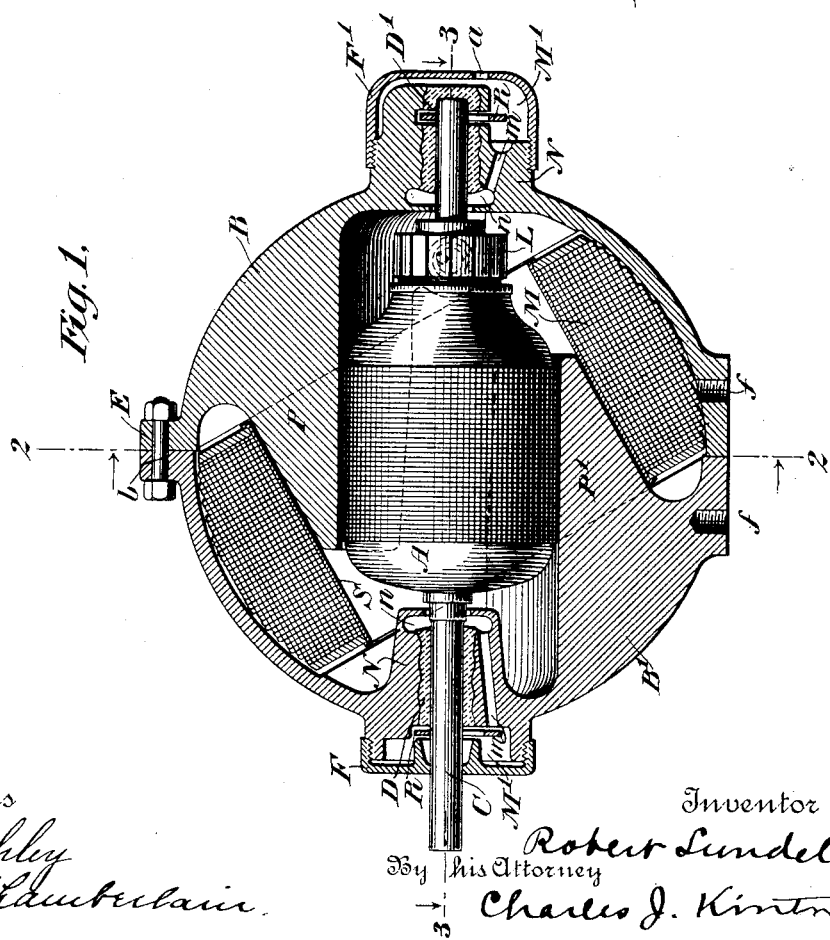

Figure 1 represents a longitudinal section through the body of my improved electric motor, taken on line 1 1, Fig. 3, as seen looking in the direction of the arrows, the armature and its axle being shown in elevational view. Fig. 2 is an end view looking into the interior of one of the field-magnet cores, as seen looking in the direction of the arrows at right angles to the line 2 2 in Fig. 1, the other field-core having been detached and the field-magnet coil and armature removed, so as to illustrate the interior contour of the field-magnet core. Fig. 3 is a longitudinal sectional view taken through Fig. 1, and as seen looking in the direction of the arrows, the armature and field-magnet coil having been removed, the commutator-brushes appearing one in elevation and the other in section, with their free ends resting upon the commutator illustrated in broken lines. Fig. 4 is a side elevational view of one of my improved motors supported by a standard and base and provided with a well-known form of rotary fan.

Referring now to the drawings in detail, B B' represent the field-magnet cores, which are so constructed that they constitute at one and the same time the pole-pieces P P' and a spherical two-part inclosing shell held together by bolts or screws $b$, extending through ears E, three or more in number. These two semispherical pole-pieces are so cast or otherwise constructed that their inner ends, resting over the opposite ends of the armature A and near the center of the field-magnet coil M, embrace a minimum amount of magnetic metal. These internally-projecting pole-pieces P P' extend past or overlap each other, as shown, and are preferably integral with the semi-spherical exterior portions B B'. It will be observed that the axis of the field-magnet coil wound upon the spool S is inclined at an angle with the axis C of the armature A and that by such an arrangement I am enabled to give to the opposite overlapping poles P P' magnetism of different polarity, and, further, that by virtue of this arrangement I am enabled to concentrate all of the magnetic lines of force at points directly opposite the poles of the armature as it rotates and to utilize all of these lines in a most effectual manner.

The armature A is of any preferred construction and is provided with the usual commutator L, against which rest the ends of two commutator-brushes $c$, preferably of carbon, held in position by metallic sleeves $s'$, which in turn are secured by bayonet-joint connections, as shown, with rubber or vegetable-fiber tubes $s$, firmly secured in openings drilled through the magnetic shell B, as clearly illustrated in Fig. 3.

$s^2$ are spiral springs within the sleeves $s'$ for giving to the commutator-brushes end movements as they wear away on the commutator L.

$t\ t$ are binding-screws, to which are secured the conductors running to the source of electrical supply. (Not shown.)

It is obvious, therefore, that the commutator-brushes are entirely concealed and may be quickly and readily removed for repairs.

F and F' are caps, which act as oil-chambers and are secured to the parts B B' by screw-threads, as shown.

$a$ is an air-vent in the cap F', and a similar vent may be provided in the cap F.

$n$ and $m$ are grooves or channels adapted to admit air to the interior of the machine and to carry the drip-oil from the inner portions of the axis back to the oil-chambers M'.

R R are flat oil-conveying rings or washers of well-known form, extending into the oil-chambers M' and carried by the axle C.

D D' represent Babbitt-metal journal-bearings, preferably cast in position around the journals of the axle C.

Many of the features of my invention are equally as applicable to dynamo-electric machines as to electric motors, as will be fully understood by those skilled in the art.

Although I have illustrated my improved motor as especially adapted to the driving of a fan $F^2$ and sustained on a base K and standard G by screws entering the screw-holes $ff$, it may be utilized for all purposes where motors of this type are needed.

I am aware that it is old in the art to conceal all the parts of an electric motor within a spherical shell made of two parts, and I make no claim hereinafter broad enough to include such a structure.

I am aware that it is old in the art to incline the axis of an armature to that of a single surrounding field-coil, and I do not claim, broadly, such a structure. I am not aware, however, that any one has heretofore constructed an electric motor in which the effective field-magnet poles were integral with the two hemispheres and so arranged as to extend past or overlap each other; nor am I aware that any one has utilized a single field-magnet coil in a motor of this type in which said coil surrounds and includes within its effective field inwardly-projecting pole-pieces overlapping each other and the opposite ends of the armature-coil.

Having thus described my invention, what I claim, and desire to secure by Letters Patent of the United States, is—

1. An electric motor having a rotary armature and two overlapping field-magnet poles, all surrounded by a single field-magnet coil, substantially as described.

2. An electric motor having the axes of its field-magnet and armature coils inclined at an angle to each other, with field-magnet poles included in the angular space between said coils, substantially as described.

3. Two semi-spherical field-magnet cores having internally-projecting overlapping pole-pieces and a single field-magnet coil, substantially as described.

4. Two semi-spherical field-magnet cores having internally-projecting overlapping pole-pieces integral therewith, substantially as described.

5. A pair of semi-spherical field-magnet cores having internally-projecting overlapping pole-pieces integral therewith, a rotary armature, and a single surrounding field-magnet coil, substantially as described.

6. A pair of semi-spherical field-magnet cores inclosing a single field-magnet coil and a rotary armature, the effective poles of the field-magnet lying between the armature and the surrounding field-magnet coil, substantially as described.

7. Two hemispheres made of magnetic material having internal overlapping pole-pieces cast integral therewith, and a single field-magnet coil which surrounds the pole-pieces, and a rotary armature, substantially as described.

8. Two hemispheres of magnetic material having internal overlapping pole-pieces integral therewith and means for holding the said hemispheres together, substantially as described.

9. Two hemispheres of magnetic material having each an internal semi-cylindrical pole-piece integral therewith and each overlapping the other, substantially as described.

10. Two hollow hemispheres of magnetic material having each a semi-cylindrical pole-piece integral with its inner face, said pole-pieces overlapping each other, a rotary armature journaled in the opposite hemispheres and lying between the pole-pieces, in combination with a single field-magnet coil, substantially as described.

11. An electric motor having all of its parts inclosed in a two-part magnetic shell, which sustains the journal-bearings of the armature-shaft and the commutator-brushes, the latter being adjustably secured in insulating-sleeves, substantially as described.

12. An iron-clad electric motor consisting of two hemispheres of magnetic material having the journal-bearings of the armature-shaft in the opposite hemispheres and commutator-brushes secured in one of said parts in insulating-sleeves, substantially as described.

ROBERT LUNDELL.

Witnesses:
C. J. KINTNER,
G. M. CHAMBERLAIN.